(12) United States Patent
Selent et al.

(10) Patent No.: US 8,911,003 B2
(45) Date of Patent: Dec. 16, 2014

(54) ARRANGEMENT CONSISTING OF A SUPPORT AND A TIE BOLT

(75) Inventors: Fabian Selent, Hennigsdorf (DE); Tino Joske, Hennigsdorf (DE)

(73) Assignee: Carl Freudenberg KG, Weinheim (DE)

( * ) Notice: Subject to any disclaimer, the term of this patent is extended or adjusted under 35 U.S.C. 154(b) by 368 days.

(21) Appl. No.: 13/356,978

(22) Filed: Jan. 24, 2012

(65) Prior Publication Data
US 2012/0286132 A1 Nov. 15, 2012

(51) Int. Cl.
*B62D 33/06* (2006.01)
*F16F 15/02* (2006.01)

(52) U.S. Cl.
CPC ............ *F16F 15/02* (2013.01); *B62D 33/0604* (2013.01)
USPC .................................. 296/190.07; 180/89.12

(58) Field of Classification Search
CPC ........... B62D 33/0604; B62D 33/0608; B62D 33/067; B62D 33/0617; B62D 33/0636; B62D 33/0621; B62D 33/06; B60G 99/004; B60R 21/131; B60R 11/02; B60J 5/0487; B66F 9/07545; E02F 9/166
USPC ........ 296/190.07, 190.04, 190.01; 180/89.12, 180/89.13
See application file for complete search history.

(56) References Cited

U.S. PATENT DOCUMENTS

| | | | | |
|---|---|---|---|---|
| 3,380,773 A * | 4/1968 | Sewelin | ................. | 296/190.05 |
| 3,656,799 A * | 4/1972 | Malm et al. | ................. | 296/35.1 |
| 3,847,492 A * | 11/1974 | Kennicutt et al. | ............. | 403/224 |
| 3,990,737 A * | 11/1976 | Palmer | ........................ | 296/35.1 |
| 4,023,851 A * | 5/1977 | Palmer et al. | ............ | 296/190.08 |
| 4,079,986 A * | 3/1978 | Redford | .................... | 296/190.04 |
| 4,274,671 A * | 6/1981 | Slosiarek et al. | ........ | 296/190.07 |
| 4,309,138 A * | 1/1982 | Jarman et al. | .................. | 411/55 |
| 4,324,303 A * | 4/1982 | Balzer et al. | .................. | 180/9.5 |
| 4,630,700 A * | 12/1986 | Larsson | ..................... | 180/89.13 |
| 4,871,189 A * | 10/1989 | Van Breemen | ............ | 267/64.27 |
| 5,064,242 A | 11/1991 | Fujan et al. | | |
| 5,984,036 A * | 11/1999 | Higuchi et al. | ............ | 180/89.12 |
| 6,017,073 A * | 1/2000 | Lindblom et al. | ........... | 296/35.1 |
| 6,029,764 A * | 2/2000 | Schubert | .................... | 180/89.13 |
| 6,374,935 B1 * | 4/2002 | Kirschenmann et al. | .. | 180/89.12 |
| 6,408,970 B1 * | 6/2002 | Eng | .............................. | 180/89.12 |
| 6,709,046 B2 * | 3/2004 | Okazawa et al. | ........ | 296/190.07 |
| 6,726,272 B1 * | 4/2004 | Puterbaugh et al. | ..... | 296/190.01 |

(Continued)

FOREIGN PATENT DOCUMENTS

| | | |
|---|---|---|
| CA | 2619043 A1 | 7/2009 |
| CN | 101331330 A | 12/2008 |

(Continued)

*Primary Examiner* — Gay Ann Spahn
(74) *Attorney, Agent, or Firm* — Harness, Dickey & Pierce, P.L.C.

(57) ABSTRACT

An arrangement, comprising a bearing support (1), a mass to be supported (2) and a support (3), which is connected with the mass to be supported (2) and supports itself on the bearing support (1), wherein the mass to be supported (2) is movable relative to the bearing support (1) and wherein a linkage element (4) is provided, which ties the bearing support (1) onto the mass to be supported (2), in consideration of the problem, an arrangement is to be indicated in which a support is easily and permanently connected with a bearing support in a stable manner, wherein the linkage element (4) includes a disk-shaped section (5) and a bolt-shaped section (6), which are designed as one piece together.

7 Claims, 2 Drawing Sheets

(56) References Cited

U.S. PATENT DOCUMENTS

| | | | |
|---|---|---|---|
| 6,986,545 B2* | 1/2006 | Nilsson et al. | 296/190.07 |
| 7,077,226 B2* | 7/2006 | Oliver et al. | 180/89.12 |
| 7,077,227 B2* | 7/2006 | Oliver et al. | 180/89.12 |
| 7,216,925 B1* | 5/2007 | Abele et al. | 296/190.07 |
| 7,261,365 B2* | 8/2007 | Dickson et al. | 296/190.07 |
| 7,364,223 B2* | 4/2008 | Mori et al. | 296/190.07 |
| 7,416,244 B2* | 8/2008 | Polk et al. | 296/190.07 |
| 7,607,721 B2* | 10/2009 | Grimes et al. | 296/190.01 |
| 8,087,718 B2* | 1/2012 | Bengtsson et al. | 296/190.07 |
| 8,104,826 B2* | 1/2012 | Fukunaga et al. | 296/190.07 |
| 8,240,745 B2* | 8/2012 | Yamamoto et al. | 296/190.03 |
| 8,246,020 B2* | 8/2012 | Nakamura et al. | 267/131 |
| 8,430,426 B2* | 4/2013 | Rasset et al. | 280/756 |
| 8,517,456 B1* | 8/2013 | Eng | 296/190.07 |
| 8,517,457 B2* | 8/2013 | Yamamoto et al. | 296/190.07 |
| 2002/0153183 A1* | 10/2002 | Puterbaugh et al. | 180/89.13 |
| 2003/0150663 A1* | 8/2003 | Farbotnik et al. | 180/312 |
| 2004/0080181 A1* | 4/2004 | Puterbaugh et al. | 296/190.01 |
| 2006/0202515 A1* | 9/2006 | Dickson et al. | 296/190.07 |
| 2006/0261640 A1* | 11/2006 | Mori et al. | 296/190.07 |
| 2007/0278811 A1* | 12/2007 | Derham et al. | 296/35.1 |
| 2008/0122243 A1* | 5/2008 | Ravid et al. | 296/68.1 |
| 2008/0213062 A1* | 9/2008 | Johnson et al. | 411/14.5 |
| 2008/0276443 A1* | 11/2008 | Hampel | 29/469 |
| 2008/0290692 A1* | 11/2008 | Boggess | 296/187.09 |
| 2009/0289472 A1* | 11/2009 | Catanzarite et al. | 296/190.07 |
| 2012/0267915 A1* | 10/2012 | Ringer et al. | 296/190.08 |
| 2013/0313858 A1* | 11/2013 | Rager et al. | 296/190.07 |

FOREIGN PATENT DOCUMENTS

| | | |
|---|---|---|
| DE | 20313362 U1 | 1/2004 |
| DE | 60210974 T2 | 12/2006 |
| EP | 0 669 484 A1 * | 8/1995 |
| GB | 1557284 A | 12/1979 |
| JP | 6-16152 * | 1/1994 |
| JP | H07-164877 A | 6/1995 |
| JP | 2001039352 A | 2/2001 |
| SU | 931564 A1 | 5/1982 |
| SU | 1481130 A1 | 5/1989 |

* cited by examiner

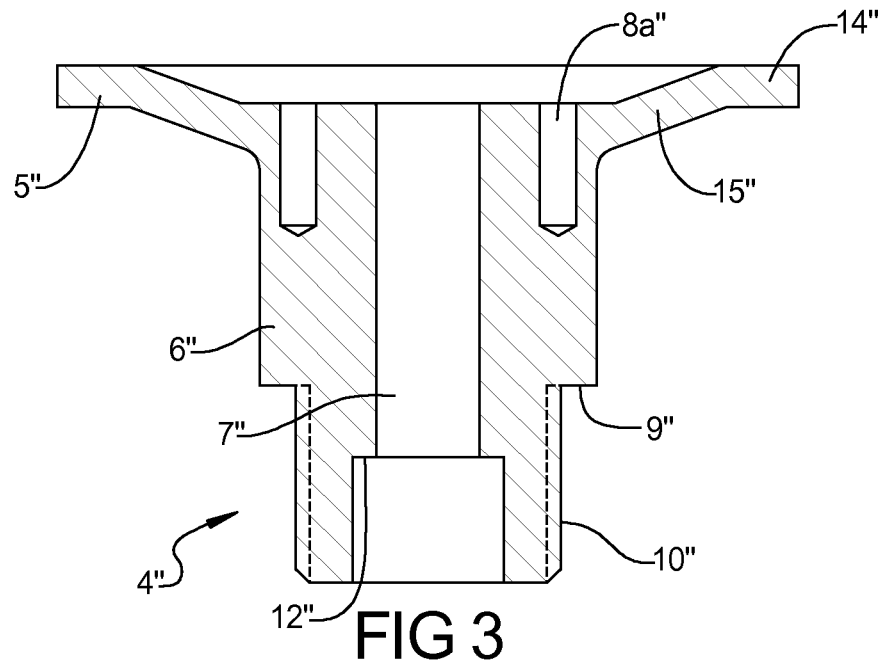
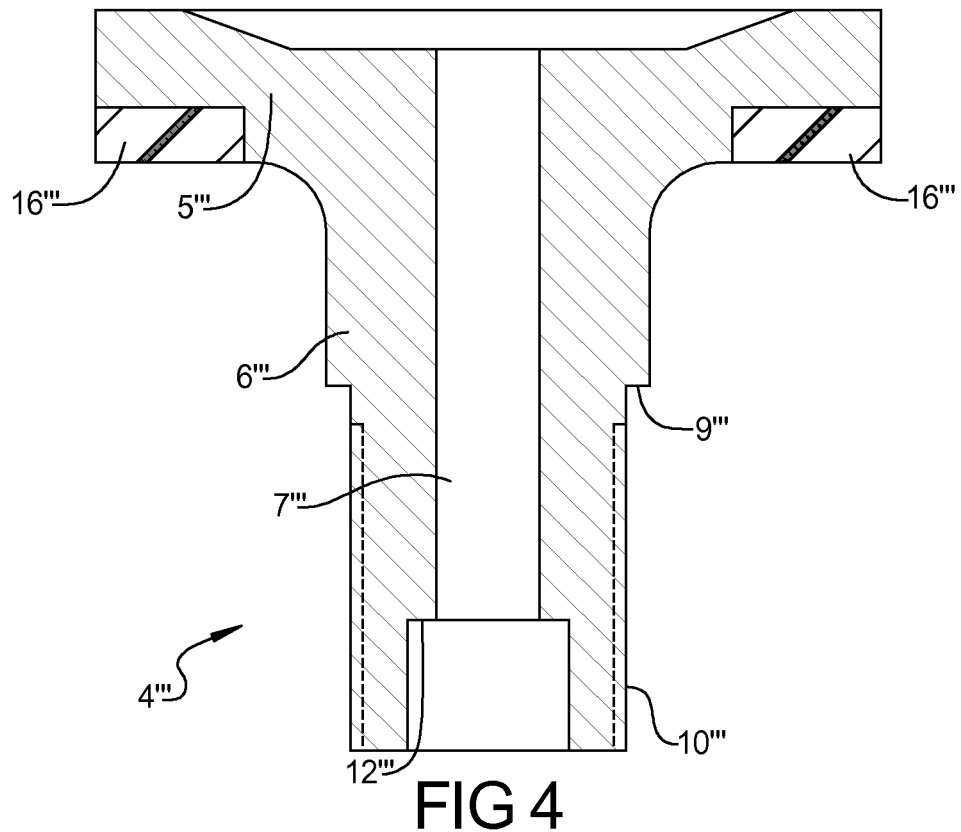

ARRANGEMENT CONSISTING OF A SUPPORT AND A TIE BOLT

CROSS-REFERENCE TO RELATED APPLICATIONS

This application claims the benefit and priority of German Patent Application No. 10 2011 101 455.5, filed May 12, 2011. The entire disclosure of the above application is incorporated herein by reference.

TECHNICAL FIELD

The present disclosure invention relates to a combination of a support and a tie bolt.

PRIOR ART

A combination of a support and a tie bolt is known from the printed patent specification DE 602 10 974 T2 "Suspension arrangement for a driver's cab." This combination is used for supporting a driver's cab relative to a vehicle frame.

In this context, the driver's cab is bolted together with a support by means of an elongated linkage element, i.e. the tie bolt, which is fixed on the vehicle frame. The support is bolted together with the driver's cab such that parts of the driver's cab are tightly braced between two nuts. The nuts are screwed onto the elongated linkage element.

A disk-shaped or plate-like vibration-damping element moreover serves for the absorption of loads in the event of accidents. The vibration-damping element is likewise connected with the elongated linkage device and vibrates together with same. Since accidents occur only once or only occasionally, the vibration-damping element is rarely subjected to extreme loads.

The disadvantage of the known construction is that torsional twisting can occur on the support, on the vibration-damping element, and/or on the elongated linkage element during assembly.

A particular disadvantage is that a support can be subjected to permanent torsional twisting. This is a particular big disadvantage insofar as if the support is designed as a viscoelastic damping elastomeric support and the torsional twisting is introduced into a load-bearing elastomeric section.

As a result of the torsional twisting and depending on the angle of torsion, a reduced service life and/or a disadvantageous change of the basic performance characteristics of the support can result.

REPRESENTATION OF THE DISCLOSURE

The present disclosure is therefore an arrangement with which a support is connected easily in a permanently stable manner with a bearing support.

The arrangement as taught by the present disclosure comprises a bearing support, a mass to be supported and a support which is connected with the mass to be supported and which supports itself on the bearing support, wherein the mass to be supported is movable relative to the bearing support and wherein a linkage element is provided which ties the bearing support to the mass to be supported. The linkage element includes a disk-shaped section and a bolt-shaped section, which are designed as one piece together.

The support must be equipped with a linkage element which is matched to the support and can function as a tie bolt. The tie bolt which includes a disk-shaped section and a bolt-shaped section which is connected therewith as one piece is particularly sturdy because of its one-piece design. Furthermore, a bolt-like section can be accommodated easily in a bearing support, wherein the disk-shaped section can fit firmly against the support. The bearing support can be arranged non-positively against a suitable contact surface of the bolt-shaped section. To that extent an arrangement is indicated, in which a support can be easily and permanently connected with a bearing support in a stable manner.

Inside the linkage element, a through hole could be provided in which a bolt is held, the bolt head of which bears against a face of the linkage element. For this purpose, the linkage element is designed as a tie bolt. A through hole is used for attaching the tie bolt directly onto the support by means of a bolt. The bolt can be screwed into the tie bolt and through same into the support, wherein the bolt head bears against a suitable face.

In view of this background, the threaded end of the bolt facing away from the bolt head could be screwed into the support. The linkage element and/or the tie bolt can thus be attached easily to the support. The threaded end could be screwed into a hydro-mount or into an elastomeric support.

Shear pins could be held in the support and in the linkage element, which extend from the support into the linkage element. The shear pins ensure anti-twist protection between the linkage element and/or between the tie bolt and the support. By these design features of the arrangement, any twisting of a load-bearing elastomeric section of the support can be prevented, in particular during the assembly of the support.

The bolt-shaped section could comprise a circular contact surface for the bearing support. This facilitates an abutment and assembly of the linkage element with the bearing support that is almost free of tilt.

The bolt-shaped section could have a threaded section. Thus a non-positive closure can be accomplished via a screw joint, which connects a threaded section of the bolt-shaped section, the bearing support, the mass to be supported, and at least one screw nut with each other.

At least one elastomeric stop element could be formed on the linkage element. In this manner, the linkage element can stop gently against a counter bearing. To that extent, progressive stop behavior can be realized. Elastomeric stop elements can be arranged on opposite sides of the linkage element.

The support described here can be configured as an elastomeric support or a hydro-mount, which is provided with a tie bolt similar to the type of the linkage element.

Engines, transmissions, compressors or generators can be supported using the arrangement described here that includes a support and a tie bolt.

This arrangement can be used particularly in systems for energy generation, i.e. in wind power plants, in systems for the production of raw materials and in purification or processing of raw materials.

Now there are various possibilities to design and further develop the teaching of the present disclosure advantageously. For this purpose, reference is made to the subsequent explanations of preferred embodiments of the disclosure by means of the drawings.

In connection with the explanation of the preferred embodiments by means of the drawings, also generally preferred embodiments and further developments of the teaching will be discussed.

BRIEF DESCRIPTION OF THE DRAWING which shows:

FIG. 3 is a cross-sectional view of a linkage element with a shorter bolt-shaped section; and FIG. 4 is a cross-sectional view of a further embodiment of the linkage element which cannot hold any shear pins.

IMPLEMENTATION OF THE DISCLOSURE

Figure 1:
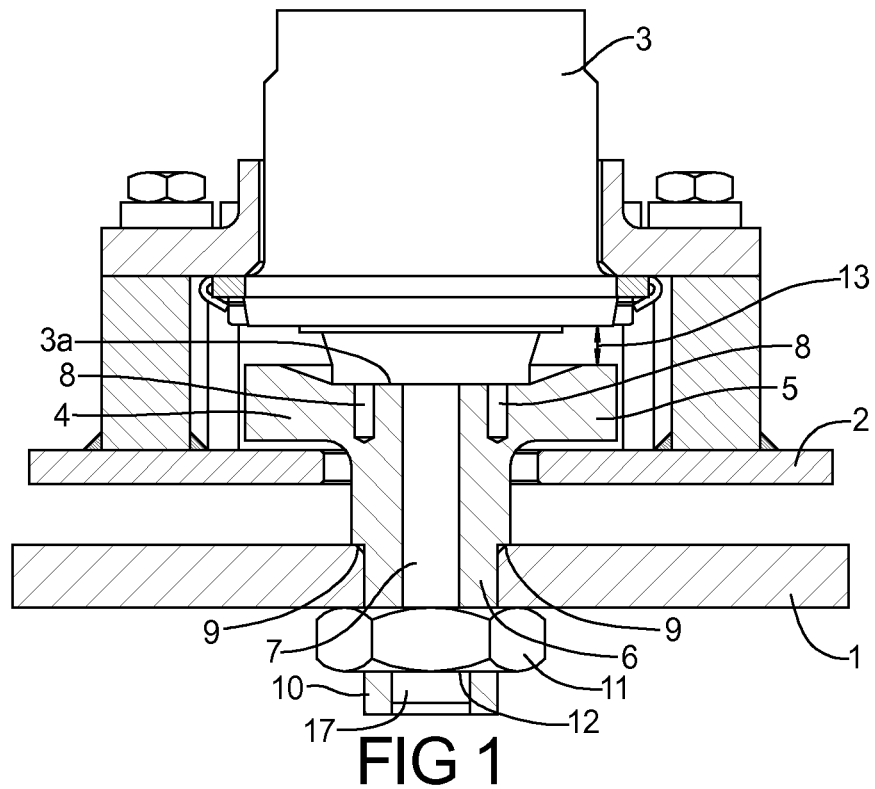
FIG. 1 is a cross-sectional view of an arrangement comprising a bearing support, a mass to be supported and a support, wherein the support is connected with a linkage element which is bolted together with the bearing support.

FIG. 1 shows an arrangement comprising a bearing support 1, a mass to be supported 2 and a support 3, which is connected with the mass to be supported 2 and supports itself on the bearing support 1, wherein the mass to be supported 2 is movable relative to the bearing support 1 and wherein a linkage element 4 is provided, which ties the bearing support 1 onto the mass 2 to be supported.

The linkage element 4 consists of a disk-shaped section 5 and a bolt-shaped section 6, which are designed as one piece together.

The mass 2 to be supported comprises a cab floor of a vehicle cab, the bearing support 1 is part of a vehicle frame. The support 3 is designed as a hydro-mount. The linkage element 4 is designed as a tie bolt.

Inside of the linkage element 4 a through hole 7 is provided, in which a bolt (17) can be held, the bolt head of which can bear against a face 12 of the linkage element 4.

The threaded end of the bolt facing away from the bolt head can have been screwed into the support 3.

FIG. 1 shows that shear pins 8 are held in the support 3 and in the linkage element 4, which extend from the support 3 into the linkage element 4.

The bolt-shaped section 6 has a circular contact surface 9 for the bearing support 1. The bolt-shaped section 6 has a threaded section 10, which is bolted together with a nut 11.

The linkage element 4 is designed and/or arranged such that a clearance 13 is formed between the support 3 and a circular surface of the linkage element 4 facing the support 3. In this respect the linkage element 4 is optimized such that clearances 13 can occur in the arrangement. In this context, the linkage element 4 bears against the support 3 in a central area 3a of the support 3.

The linkage element 4 is optimized such that it resists breaking loads or scoring effects. In terms of design, the linkage element 4 is furthermore adapted optimally to the required installation space. The linkage element 4 can have elastomeric stop elements 16''', as illustrated in FIG. 4.

The arrangement shown in FIG. 1 can also be installed if rotated by 180°, whereas this type of design is not represented. In this case, the linkage element 4 would be arranged such that the threaded section 10 is arranged so that it projects out to the top. In this context, the mass 2 to be supported and the bearing support 1 would swap their places.

Figure 2:
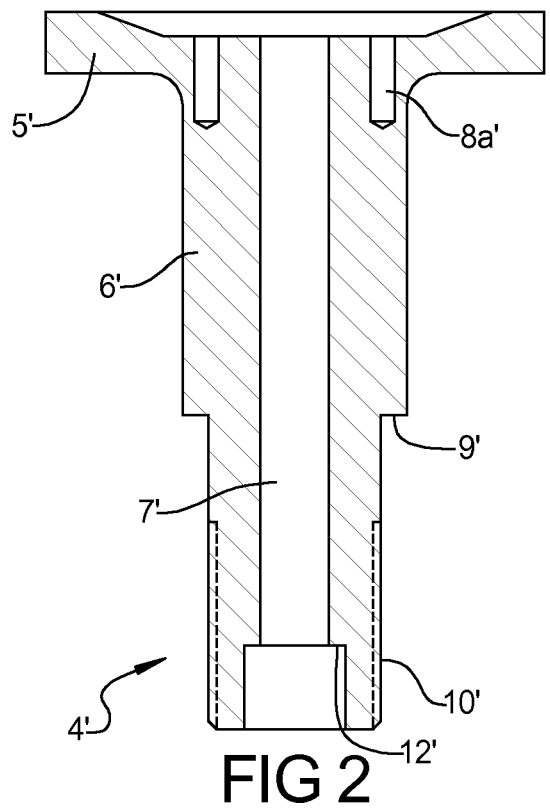
FIG. 2 is a cross-sectional view of a linkage element with an elongated bolt-shaped section.

FIG. 2 shows an elongated linkage element 4', which consists of a disk-shaped section 5' and a bolt-shaped section 6', which are designed as one piece together. Inside the linkage element 4', a through hole 7' is provided, in which a bolt can be held, the bolt head of which can bear against a face 12' of the linkage element 4'. Bores 8a' for shear pins 8 are incorporated in the linkage element 4'. The bolt-shaped section 6' has a circular contact surface 9' for the bearing support 1. The bolt-shaped section 6' has a threaded section 10'.

The elongated linkage element 4' is designed optimally in terms of installation space. It can bridge large distances and/or large clearances between the bearing support 1 and the mass 2 to be supported.

FIG. 3 shows a shorter linkage element 4', which consists of a disk-shaped section 5" and a bolt-shaped section 6", which are designed as one piece together. Inside the linkage element 4", a through hole 7" is provided, in which a bolt can be held, the bolt head of which can bear against a face 12" of the linkage element 4". Bores 8a" for shear pins 8 are incorporated in the linkage element 4". The bolt-shaped section 6" has a circular shaped contact surface 9" for the bearing support 1. The bolt-shaped section 6" has a threaded section 10".

The linkage element 4" is especially capable of resisting scoring effects well. It can absorb very great deformation energies. For this purpose, the disk-shaped section 5" essentially has a uniform thickness in the radial direction.

A radial, outer circular peripheral area 14" terminates to the inside in the radial direction against a circular inclined area 15" which is inclined towards the longitudinal axis of the linkage element 4". The circular inclined area 15" is inclined down in the direction of the threaded section 10".

The linkage element 4" is designed optimally in terms of installation space. It can bridge smaller distances and/or smaller clearances between the bearing support 1 and the mass 2 to be supported.

FIG. 4 shows a further linkage element 4''', which consists of a disk-shaped section 5''' and a bolt-shaped section 6''', which are designed as one piece together. Inside the linkage element 4''', a through hole 7''' is provided, in which a bolt can be held, the bolt head of which can bear against a face 12''' of the linkage element 4'''. No bores for shear pins 8 are incorporated in the linkage element 4'''. The bolt-shaped section 6''' has a circular-shaped contact surface 9''' for the bearing support 1. The bolt-shaped section 6''' has a threaded section 10'''.

The linkage element 4''' has an elastomeric stop element 16''' on its disk-shaped section 5'''. In this manner, a progression in the stop behavior of the linkage element 4''' can be accomplished.

The elastomeric stop element 16''' is arranged on the side of the disk-shaped section 5''' facing the threaded section 10'''. But an elastomeric stop element can also be arranged solely or additionally on the opposite side, however.

With respect to further advantageous embodiments and further developments of the teaching of the invention, reference is made to the general part of the description on the one hand, and to the enclosed Claims on the other.

The invention claimed is:

1. An arrangement, comprising a bearing support (1), a mass to be supported (2) and a support (3), which is connected with the mass to be supported (2) and supports itself on the bearing support (1), wherein the mass to be supported (2) is movable relative to the bearing support (1) and wherein a linkage element (4) is provided, which ties the bearing support (1) onto the mass to be supported (2), wherein the linkage element (4) includes a disk-shaped section (5) and a bolt-shaped section (6), which are designed as one unitary piece, the disk-shaped section (5) of the linkage element (4) being located on an opposite side of the mass to be supported (2) from the bearing support (1).

2. An arrangement according to claim 1, wherein shear pins (8) are incorporated in the support (3) and in the linkage element (4) which extend from the support (3) into the linkage element (4).

3. An arrangement according to claim 1, wherein the bolt-shaped section (6) has a circular contact surface (9) for the bearing support (1).

4. An arrangement according to claim 1, wherein the bolt-shaped section (6) has a threaded section (10).

5. An arrangement according to claim 1, wherein at least one elastomeric stop element (16′″) is formed on the linkage element (4′″).

6. An arrangement, comprising a bearing support (1), a mass to be supported (2) and a support (3), which is connected with the mass to be supported (2) and supports itself on the bearing support (1), wherein the mass to be supported (2) is movable relative to the bearing support (1) and wherein a linkage element (4) is provided, which ties the bearing support (1) onto the mass to be supported (2), wherein the linkage element (4) includes a disk-shaped section (5) and a bolt-shaped section (6), which are designed as one unitary piece;
    wherein a through hole (7) inside the linkage element (4) is provided, in which a bolt (17) is held, the bolt head of which bears against a face (12) of the linkage element (4).

7. An arrangement, comprising a bearing support (1), a mass to be supported (2) and a support (3), which is connected with the mass to be supported (2) and supports itself on the bearing support (1), wherein the mass to be supported (2) is movable relative to the bearing support (1) and wherein a linkage element (4) is provided, which ties the bearing support (1) onto the mass to be supported (2), wherein the linkage element (4) includes a disk-shaped section (5) and a bolt-shaped section (6), which are designed as one unitary piece;
    wherein a through hole (7) inside the linkage element (4) is provided, in which a bolt (17) is held, the bolt head of which bears against a face (12) of the linkage element (4);
    wherein the threaded end of the bolt facing away from the bolt head is screwed into the support (3).

* * * * *

UNITED STATES PATENT AND TRADEMARK OFFICE
CERTIFICATE OF CORRECTION

| | | |
|---|---|---|
| PATENT NO. | : 8,911,003 B2 | Page 1 of 1 |
| APPLICATION NO. | : 13/356978 | |
| DATED | : December 16, 2014 | |
| INVENTOR(S) | : Fabian Selent et al. | |

It is certified that error appears in the above-identified patent and that said Letters Patent is hereby corrected as shown below:

On the Title Page, Item (30), the Foreign priority data should be listed as:

GERMANY 10 2011 101 455.5  05-12-2011

Signed and Sealed this
Eighth Day of September, 2015

Michelle K. Lee
*Director of the United States Patent and Trademark Office*